United States Patent
Rainey (10) Patent No.: US 6,413,099 B2
(45) Date of Patent: Jul. 2, 2002

(54) EDUCATIONAL DEVICE FOR TEACHING SIMPLE AND COMPLEX MATHEMATICAL CONCEPTS

(76) Inventor: John Desmond Rainey, P.O. Box 40-288, Glenfield, Auckland (NZ)

(*) Notice: Subject to any disclaimer, the term of this patent is extended or adjusted under 35 U.S.C. 154(b) by 0 days.

(21) Appl. No.: 09/214,008

(22) PCT Filed: Jun. 25, 1997

(86) PCT No.: PCT/NZ97/00082
§ 371 (c)(1),
(2), (4) Date: Dec. 23, 1998

(87) PCT Pub. No.: WO98/00822
PCT Pub. Date: Jan. 8, 1998

(30) Foreign Application Priority Data

Jul. 2, 1996 (NZ) .............................................. 286316

(51) Int. Cl.⁷ .......................... G09B 19/02; A63H 1/00
(52) U.S. Cl. ........................ 434/191; 434/188; 446/266
(58) Field of Search .................. 434/188, 190, 434/191, 193, 194, 195, 196, 197, 198, 200, 202, 203, 204, 205, 206, 208; 446/266

(56) References Cited

U.S. PATENT DOCUMENTS

| | | | | |
|---|---|---|---|---|
| 564,396 A | * | 7/1896 | Sheppard | 434/202 |
| 1,728,491 A | * | 9/1929 | Janneson | 434/203 |
| 2,956,369 A | * | 10/1960 | Rolin | 446/266 |
| 2,987,827 A | * | 6/1961 | Carnegie | 434/202 |
| 2,991,585 A | * | 7/1961 | Drees | 446/266 |
| 3,306,612 A | * | 2/1967 | Rosen | 226/266 |
| 3,693,286 A | * | 9/1972 | Marcotti | 446/266 |
| 3,703,040 A | * | 11/1972 | Hill | 434/202 |
| 4,206,566 A | * | 6/1980 | Churchman | 446/266 |
| 4,902,230 A | * | 2/1990 | Jones | 434/206 |
| 4,986,790 A | * | 1/1991 | Boury | 446/266 |
| 5,149,269 A | * | 9/1992 | Ylitalo | 434/203 |

* cited by examiner

Primary Examiner—Jacob K. Ackun, Jr.
Assistant Examiner—Kurt Fernstrom (57) ABSTRACT

The device consists of arms which revolve on a handle. It can be manipulated in a number of ways and adapts both to play and to serious educational purpose. In broad educational mode the device is an exploration tool and toy where children can develop skills and play invented games or invent their own. In its main educational use, the device is a mathematics exploration tool and toy; is of a construction which makes it compatible with the decimal system of number among others; and in particular provides a visual-kinaesthetic method for the teaching/learning/understanding/exploration of mathematics.

20 Claims, 10 Drawing Sheets

EDUCATIONAL DEVICE FOR TEACHING SIMPLE AND COMPLEX MATHEMATICAL CONCEPTS

TECHNICAL FIELD

This invention relates to an educational device. In particular, this invention relates to an educational device enabling the teaching of simple and complex mathematical concepts and operations to children using random and planned combinations of numbers and operations.

BACKGROUND ART

Many teaching aids for children's education are known and used around the world. For the teaching of mathematics, devices representing numbers, such as building blocks, rods and abaci are used. However, many such devices render it difficult for children to understand manipulation of numbers and basic processes and operations in mathematics particularly regarding subtraction, multiplication, division, fractions, decimals, ratios, percentages, place value and number bases, as well as basic concepts and operations in algebra and geometry.

It would be desirable to provide an educational device, simple in construction and operation, that assists children in learning and understanding basic mathematical processes and operations.

It is an object of the present invention to address the foregoing problems or at least to provide the public with a useful choice.

Further aspects and advantages of the present invention will become apparent from the ensuing description which is given by way of example only.

DISCLOSURE OF INVENTION

In a first broad aspect this invention provides an educational device for teaching mathemathical concepts, characterised in that the device includes a set of arms and an elongated member having a handle at a first end and having a distal end; the elongated member being capable of receiving more than two arms rotatably attached along the length of the elongated member at one or more specified and spaced apart positions so that in use the position of a rotatable arm along the length of the elongated member, when laid down upon a surface, represents the numerical significance of that position within a series of numbers and a numerical value is indicated by the rotational position of the one or more rotatable arms about the axis of the elongated member, thereby demonstrating a visual correlate of a number.

Preferably each arm may be reversibly attached to the elongated member.

In a related aspect the elongated member is provided along its length with one or more positioning means each capable of holding a rotatable arm at a corresponding position along the length of the elongated member, so that any one arm at the one position may represent a certain numerical value.

In another related aspect the elongated member is provided along its length with a plurality of positioning means capable of holding ten arms and thereby being congruent with the decimal numbering system.

In a further related aspect the distal end of the elongated member is provided with means capable of securing end-to-end attachment to a like device, so that the length of a series of numbers that can be represented by means of the attached devices is increased.

In yet another aspect the arm is provided with attachment means capable of being rotatably attached at a position along the elongated member.

Preferably the arm is provided with an elongated portion between the attachment means and a display means.

In a yet further aspect the display means includes a visually distinctive portion.

Preferably all members of a set of arms are visually identifiable as belonging to a group.

In a second broad aspect the invention provides a method for using an educational device to teach addition, wherein the method comprises the steps of placing a predetermined number of arms upon the elongated member, twirling the device to randomise the orientation of the arms, laying the device down on a surface, and assessing the number of arms lying out to one side or the other of the elongated member, thereby providing a visual correlate of an addition operation within that predetermined group of numbers and thereby helping to illustrate the process of addition within that predetermined group of numbers.

In a related aspect the invention also provides a method for using an educational device as described previously to teach subtraction, wherein the method comprises the steps of laying the device down on a surface to display a predertmined number of arms on one side of the elongated member, rotating a number of arms corresponding to the number to be subtracted to the opposite side, counting the number of arms left on the first side to find the remainder, thereby providing a visual correlate of a subtraction and so helping to illustrate the process of subtraction.

In a related aspect the invention also provides a method for using an educational device as described previously to teach division wherein the method comprises placing a predetermined number of arms upon the elongated member, laying the device down on a surface, rotating sets of arms of a pre-determined set-size along the elongated member when it is laid down on a surface so that the sets lie alternately to one side and the other of the elongated member, and counting the number of sets that result, thereby providing a visual correlate of a division operation and so helping to illustrate the process of division.

In a related aspect the invention also provides a method for using an educational device as described previously to teach multiplication wherein the method comprises the steps of placing a pre-determined number of sets of arms of a pre-determined set-size along the elongated member when it is laid down on a surface, so that each set lies alternately on one side and the other of the elongated member, and counting the total number of arms that result, thereby providing a visual correlate of a multiplication operation and so helping to illustrate the process of multiplication.

In a related aspect the invention also provides a method for using an educational device as described previously to teach binary numeration, wherein the method comprises the steps of laying the device down on a surface, assigning a binary power of 2 to each of a number of arms upon the elongated member, placing arms in one direction from the elongated member to indicate that particular arms are activated ("on or 1") or in the opposite direction to indicate that they are deactivated ('off or 0"), thereby providing a visual correlate of a binary numeration operation performed with the device, so helping to illustrate the binary numeration operation.

In a related aspect the invention also provides a method for using an educational device as described previously to generate an unpredictable number in a manner analogous to throwing a die wherein, the method comprises the steps of placing a number of arms on the device, twirling the device to randomise the orientation of the arms, laying the device down on a surface, and counting the number of arms lying out to one side of the elongated member, thereby providing an unpredictable number lying in the range between zero and a number equal to the number of arms in use.

According to one aspect of the present invention there is provided an education device comprising a holder or axle for a plurality of side by side revolvable arms whereby in use the arms rotate by twirling the holder or by manipulating arms so that, when placed on a support surface, some arms lie on one side of the axle while the remaining arms lie on the other.

It will be appreciated that the device can be used for various games and to develop a variety of cognitive and dexterity skills while also being a mathematics device, a math exploration tool and toy, a type of abacus and a type of number-generator or dice. In mathematics use the device shows patterns which can relate to numbers, enabling people to see or determine relationships in the patterns and between the numbers they may represent.

Provision is made for parts to be added to or removed from the device to make it a math device or abacus or dice of varying numeric value or pattern, e.g. to be a '6-arm device' or an '8-arm abacus' or a 'dice of 10'. Provision is also made for coding of the parts, e.g. by arms of different colour, size, shape or imprint, again to provide abaci or dice of varying numeric or visual or spatial pattern.

In this invention the counters or balls of the traditional abacus become arms or counters or balls which are attached to or may be placed on an axle in such a way that they rotate. The shape of the arms or balls or counters is immaterial. Indeed the arms themselves can serve as balls or counters and 'arms' is used hereafter to refer to all of these. It will be appreciated that the use of the term 'arms' includes any device capable of revolving about the axle.

Arms may be placed, e.g. snapped, on the abacus or removed from it for a variety of purposes. They may be held in place by a handle at one end of the axle and a stopper or a second handle at the other end and/or by containing or guiding devices dispersed on the axle.

Arms may be without special markings or may be marked or distinguished or coded to denote numerical values such as 5 or 10 or composite values such as 5×3 or 6−2. The information which an arm reveals may have different significance according to imprint, instructions or rules, e.g. depending on whether the arm lies on one side of the axle or the other (see Best Modes below regarding use of the device of the present invention). The information may be an integral part of the arm or affixed to it or to the axle, e.g. by a sticker.

In this invention the endings of the axle of the device may be designed to fit the one with the other so that any number of the devices may be joined together and make a new device of more complex structure. The means by which one device is attached to another is immaterial.

In one preferred form the device is more particularly designed as a play thing associated with games and skills.

In a second preferred form the device is more particularly designed for educational purposes as a mathematics tool and a type of abacus and dice. That is, it provides means of understanding and operating mathematical processes such as counting, adding, subtracting, multiplying, dividing, working with fractions, decimals, ratios, percentages. In this form and congruent with the decimal number system it may, for example be provided with 10 detachable arms each having a value of '1' or such other number as may be preferred. This format provides for different sizes of dice and abaci according to how many arms are attached during use. For example, with 10 arms attached it may be a 'dice of 10' or a '10-arm abacus' while with 6 arms attached it may be a dice or abacus of 6.

In a third preferred form the device is more particularly designed for play and display purposes in the dark. Its revolving arms may be luminescent and/or hold bulbs of various colours supplied with electricity (however generated) and switches. Alternatively, light may issue from sources in the handle and/or axle. A light display may be provided using a light source in the holder with optic fibres extending from the source along the hollow rod to the counters.

Arms may be attached to the axle in a variety of ways. In a preferred form they may be clipped onto and removed from an axle which may have means of keeping arms from touching each other. However, any suitable means for attaching the arms to the axle may be used as long as the arms are able to revolve about same. The arms may be plain or in ornamented form. Ornamentation is not limited to colouring. For example, the arms may be designed to produce noise, music, light. They may be coded, e.g. with numbers, to give any desired value to the arm.

Devices may be provided with a storage bag or an accessory such as a 'holster' or belt which may be attached to the person of the user. Provision is also made for spare arms to be stored separately, as in a small bag.

BRIEF DESCRIPTION OF DRAWINGS

Further aspects of the present invention will become apparent from the following description which is given by way of example only and with reference to the accompanying drawings in which.

BEST MODES FOR CARRYING OUT THE INVENTION

Figure 1:
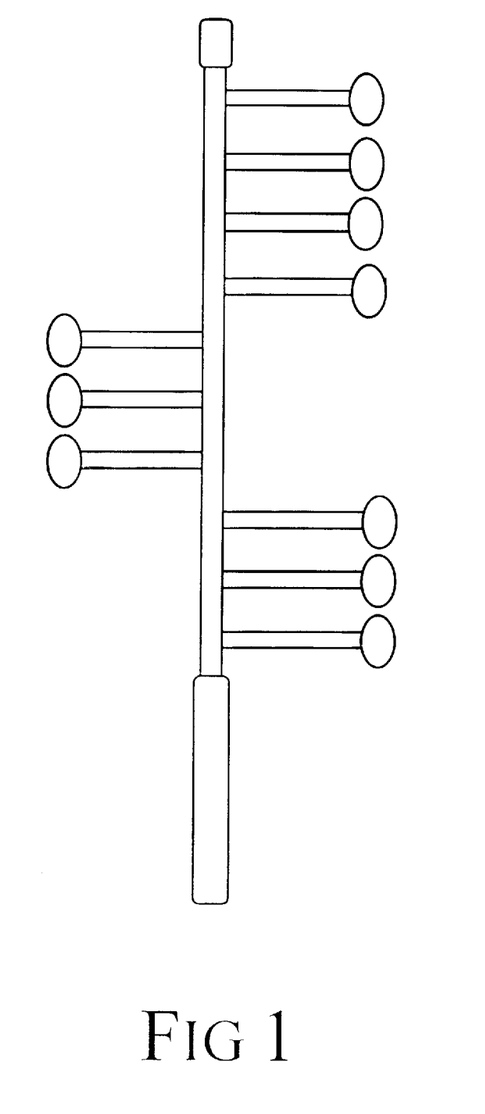
FIG. 1 is a side view of a 10-counter device showing '3 and 7' as its abacus or number pattern and '3', the number of counters to the left, as its dice value.
Figure 2:
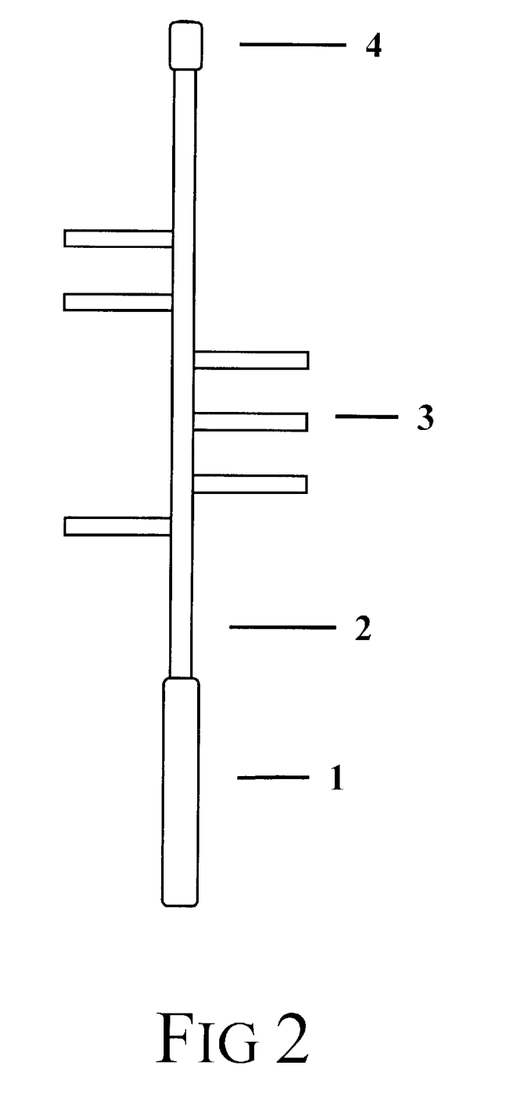
FIG. 2 is a side view of a 10-counter device with 4 counters removed and leaving a '6-arm abacus' with a '3 and 3' number pattern, or a 'dice of 6' with a value (left side) of '3'.
Figure 3:
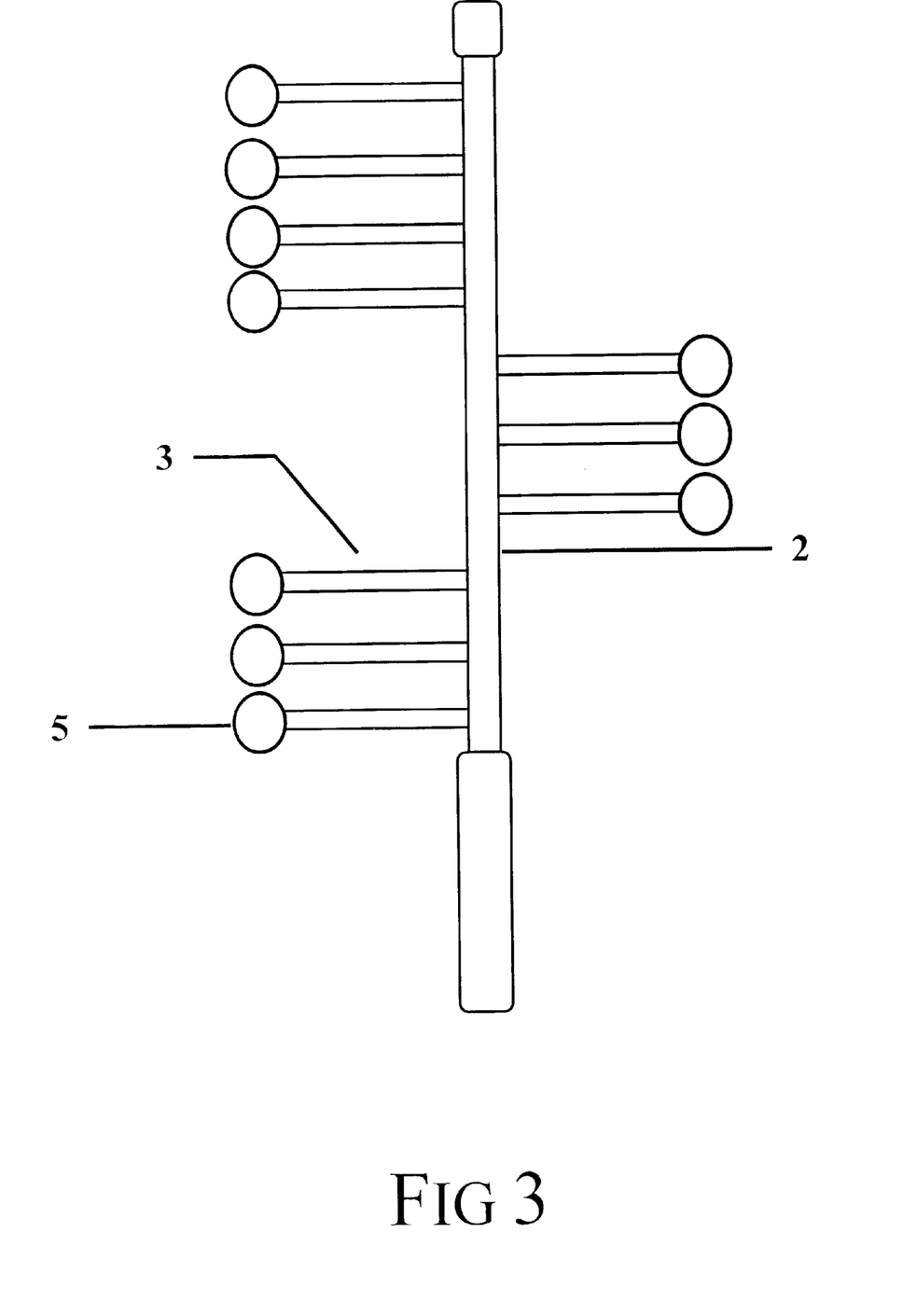
FIG. 3 is a side view of a 10-counter device showing an abacus pattern of '7 and 3' and a dice value of '7'.
Figure 4:
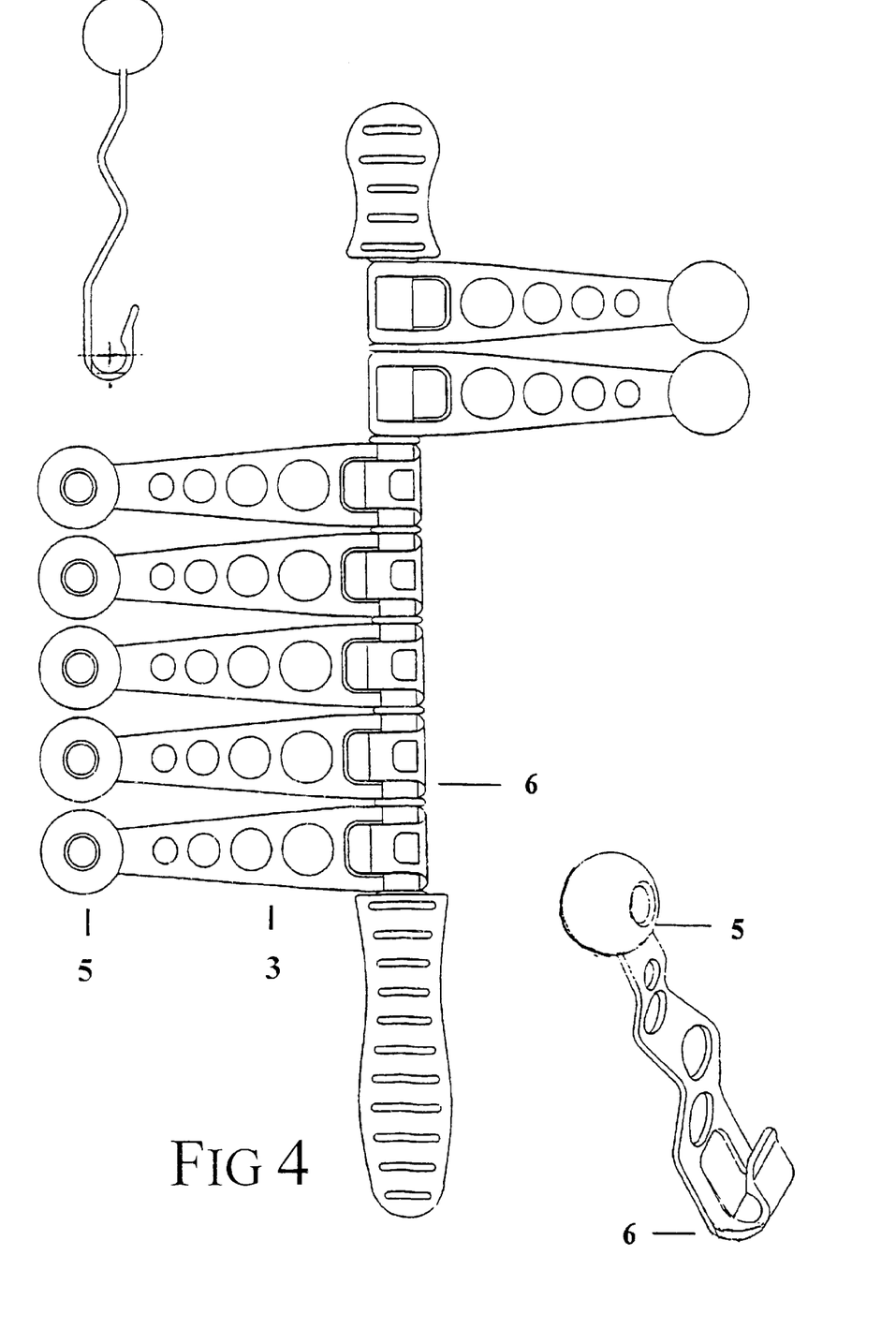
FIG. 4 shows a side view of a 7-arm play or games device and details the design of a clip.
Figure 5:
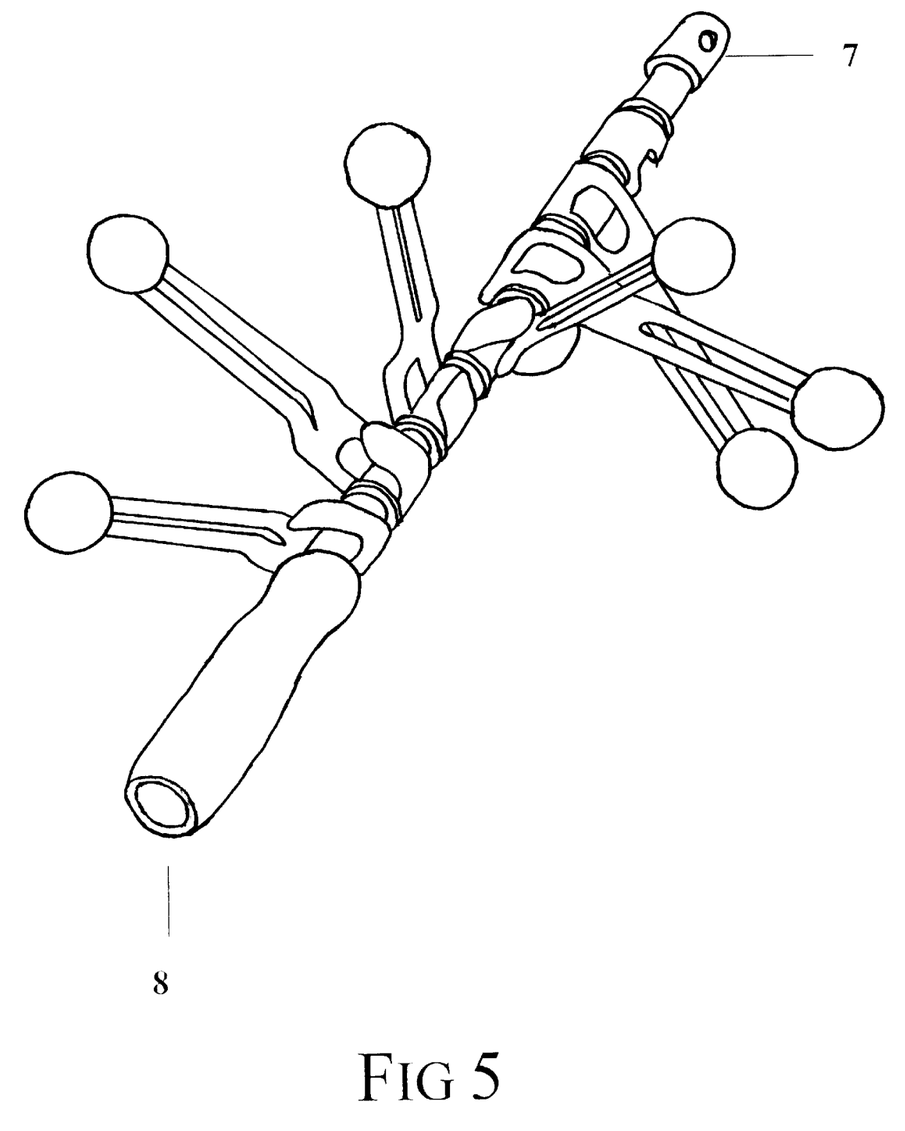
FIG. 5 is a perspective view of a 7-arm derivation designed for play, game, and dice use and shows an axle ending 7 and an axle ending 8 which would allow two or more of the devices to be joined end to end.

In the drawings moulded handle 1 and rod or axle 2 and optional secondary handle 4 provide a framework to support arms 3. Arms 3 are free to rotate on the rod 2. In FIG. 4 the ball 5 and clip 6 are integral parts of the moulded arm 3.

When the device is manipulated in use, the arms 3 can be made to rotate in clockwise or anti-clockwise fashion. This becomes the basis for skills which players can develop. Equally importantly, the device may be twirled, so that the arms 3 revolve in a relatively jumbled or random way in the air before being brought down upon a flat surface such as a table or pad or cushion (not shown). Some arms 3 will lie to the left of the axle 2 and some to the right. The sum of the arms 3 to the left and right will always equal the total number of arms 3 on the device. This forms the basis for many educational applications and for a wide variety of games and is a key feature of the abacus.

Figures 6, 7:
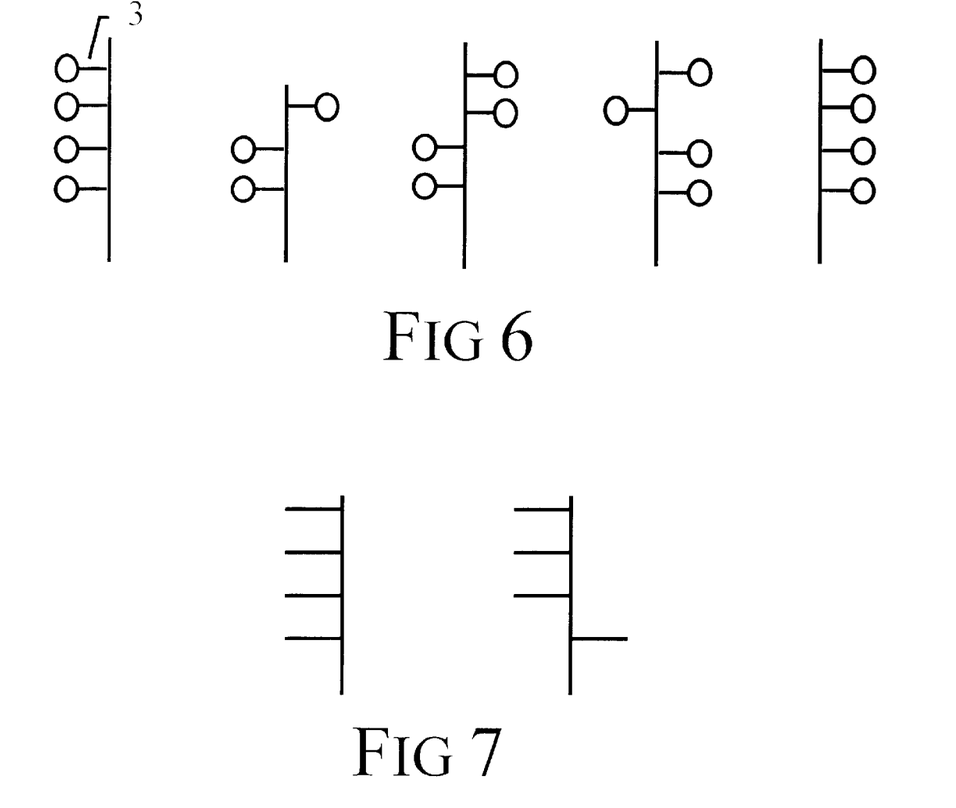
FIG. 6 shows 'visual number' patterns from a 4-arm abacus exemplifying an 'addition' or 'conservation of number' model, i.e. the patterns which make four.
FIG. 7 shows two steps in the use of the device in 'subtraction' mode, such that in the second step when one arm has been swung to the right (subtracted) three can be seen to be 'left', i.e. 4−1=3.

An example of educational use is with the learning of basic addition number facts. For facts which add to four for example, four arms 3 are placed on the device. This is shown in FIG. 6. By a count of arms to the left and right of the axle it can be demonstrated that 4+0, 3+1, 2+2, 1+3 and 0+4 all equal 4. Children can 'discover' all such patterns. They can record them, e.g. in stylised drawings. They can write them as equations and express them as 'number stories'. In this and other examples, children are helped by the clear 'visual number' patterns which the device provides.

Another example of educational use is with understanding subtraction and learning basic subtraction facts. For example, as shown in FIG. 7, when 4 arms are placed first to the left, representing any 4 objects, then when one is swung over to the right 3 are left. Children thus make discoveries such that 4−1=3 and make number stories on this basis.

Figure 8:
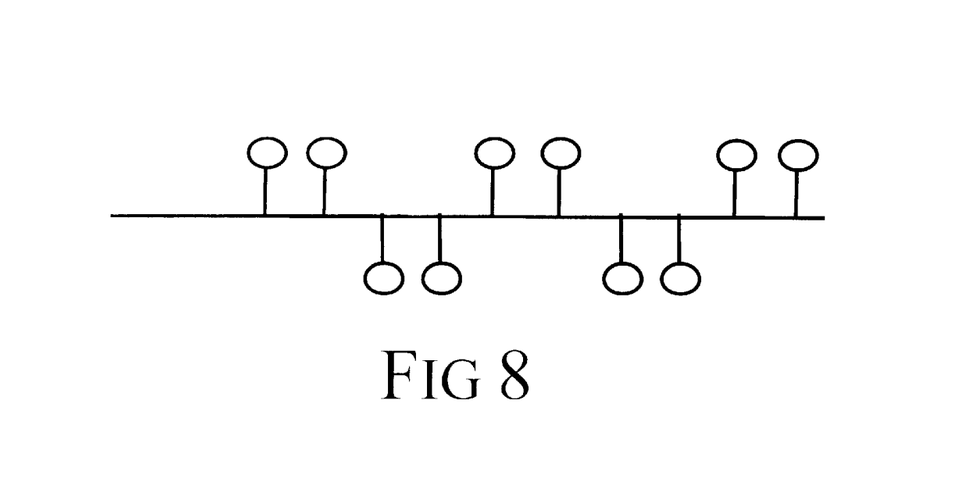
FIG. 8 shows the device in a sample multiplication/division application. Specifically, in visual number, it shows that 5×2=10 and that 10÷2=5.

Another example of educational use is with understanding multiplication and division and learning basic multiplication and division number facts. For example, children may make discoveries or engage in operations as in FIG. 8 where they find that 5 twos make 10 or that 10 can be divided into 5 equal parts.

Figure 9:
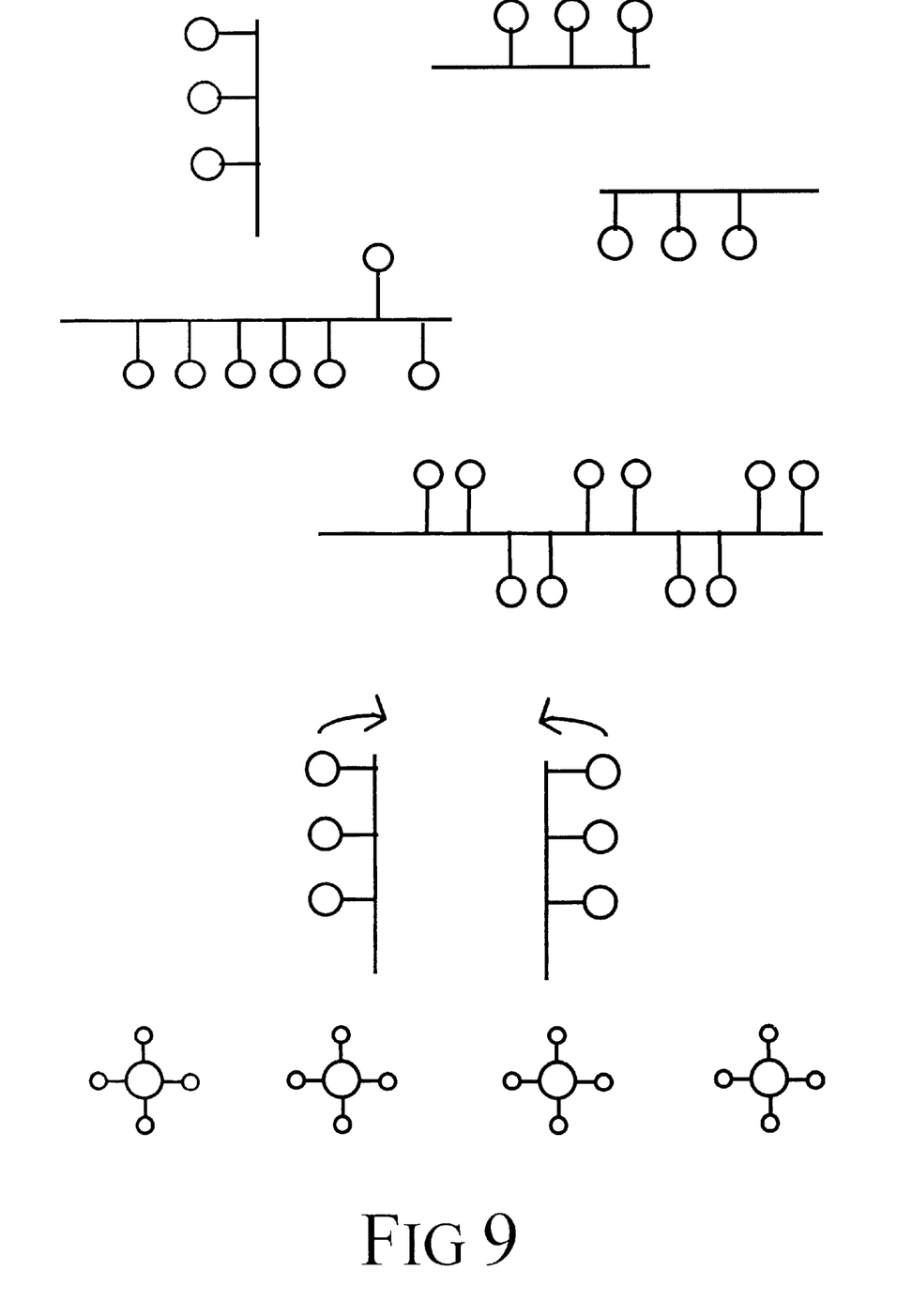
FIG. 9 shows diagrams of some shape, space and symmetry patterns with abaci of different size, i.e. relating to 'geometry' mode.

Other examples of educational use are in geometry where children are helped to explore shape and space. Visual number patterns such as are shown in FIG. 9 may be used with the device in 'still' or in 'swinging' mode to help develop concepts like 'below, top, middle, bottom, next to, beside; forwards, backwards, over, towards, away from'. They may also explore symmetry by creating or talking about symmetrical and repeating patterns.

Figure 10:
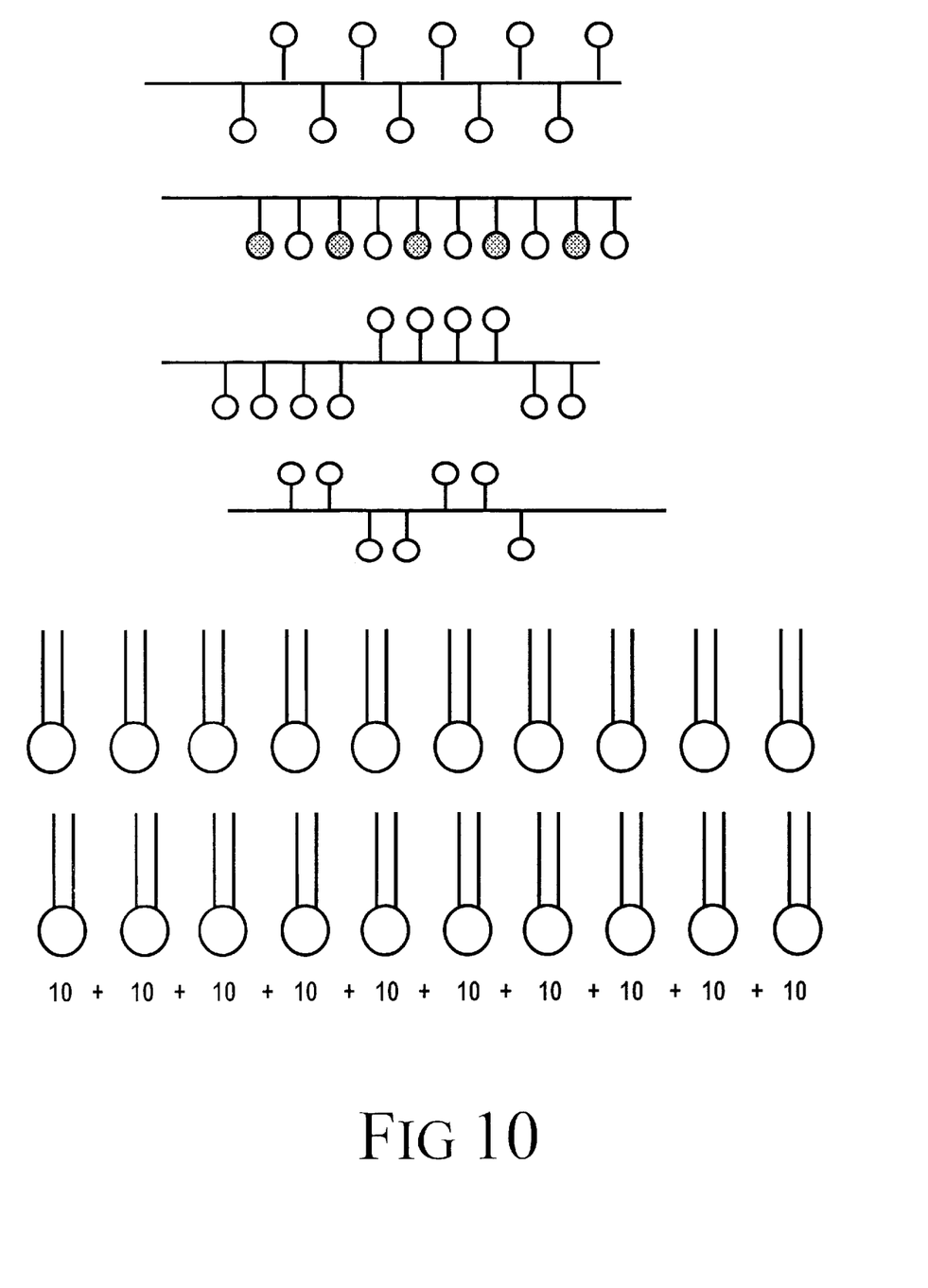
FIG. 10 exemplifies an 'algebra' mode with various patterning of balls of the same and different colour.

Other examples of educational use are in algebra. Some of these are shown in FIG. 10. The first two of the 6 diagrams show how patterns may be made with arm-endings of the same and different colours. The third pattern from the top relates conceptually to the division of 10 by 4 and shows a quotient of 2 and remainder of 2. The fourth relates to three 2s plus 1 making 7, or 7 divided into 2s. The fifth provides a schema for building a two-times table, with each of the 10 'units' being seen by children not as 'ones' but as 'twos' by focusing on the shape of the arms above the ball ending. The last diagram shows how each arm or ball may be given a value of say 10, so that the 10-times table is shown or may be derived.

Figure 11:
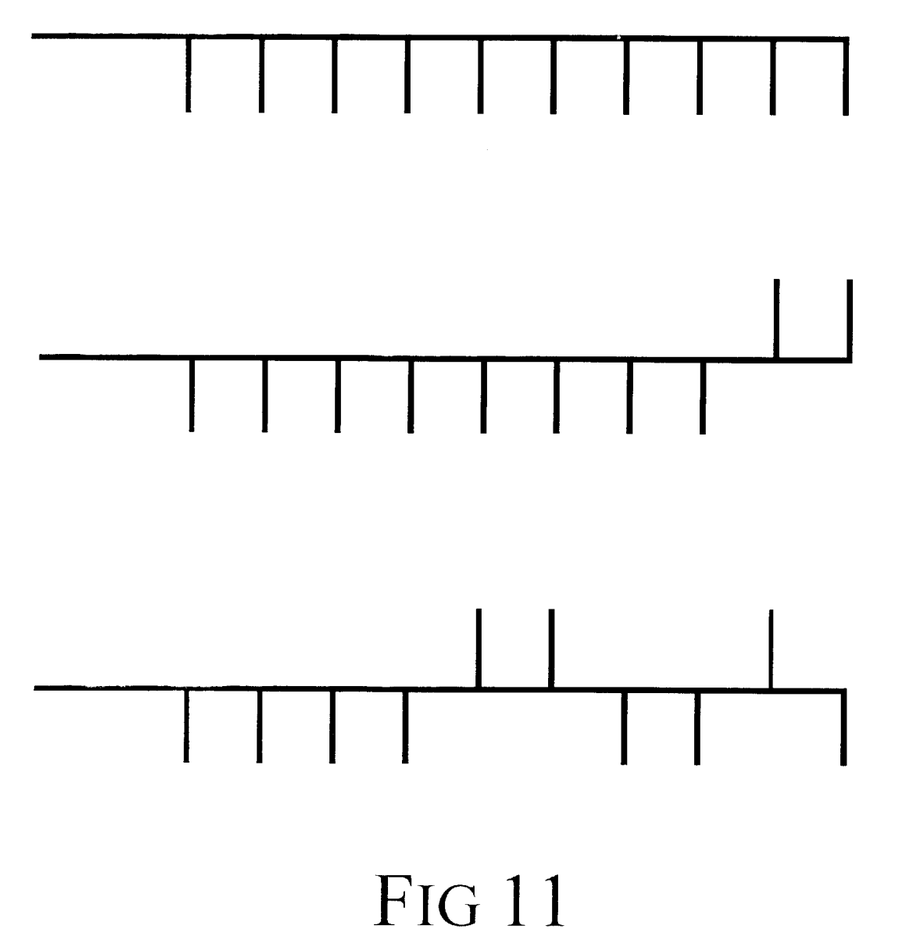
FIG. 11 shows the device in 'binary numeration' mode.

Another example of educational use is with binary numeration. In FIG. 11 and reading from the right, the arms may be given values of $2^0, 2^1, 2^2$, and so on—equating to 1, 2, 4 and so on in decimal. When the arms are in a downward position, as in the top example, they are considered 'off' and have only potential numerical value. When rotated up the arms are 'on' and their value is actualised. Thus the middle example of FIG. 11 has 2 arms 'on' and their value is 1+2, i.e. totals 3. The lower example has arms 'on' to the value (from the right) of 0+2+0+0+16+32, i.e. 50. This usage sets children down the path of discovering the binary manner by which computers handle numbers.

Similar and other procedures/models, using the device of the present invention, allow other addition, subtraction, multiplication and division number facts or combinations to be experienced and learned, likewise work with fractions, decimals, ratios and percentages as well as applications in geometry, algebra and statistics.

Figure 12:
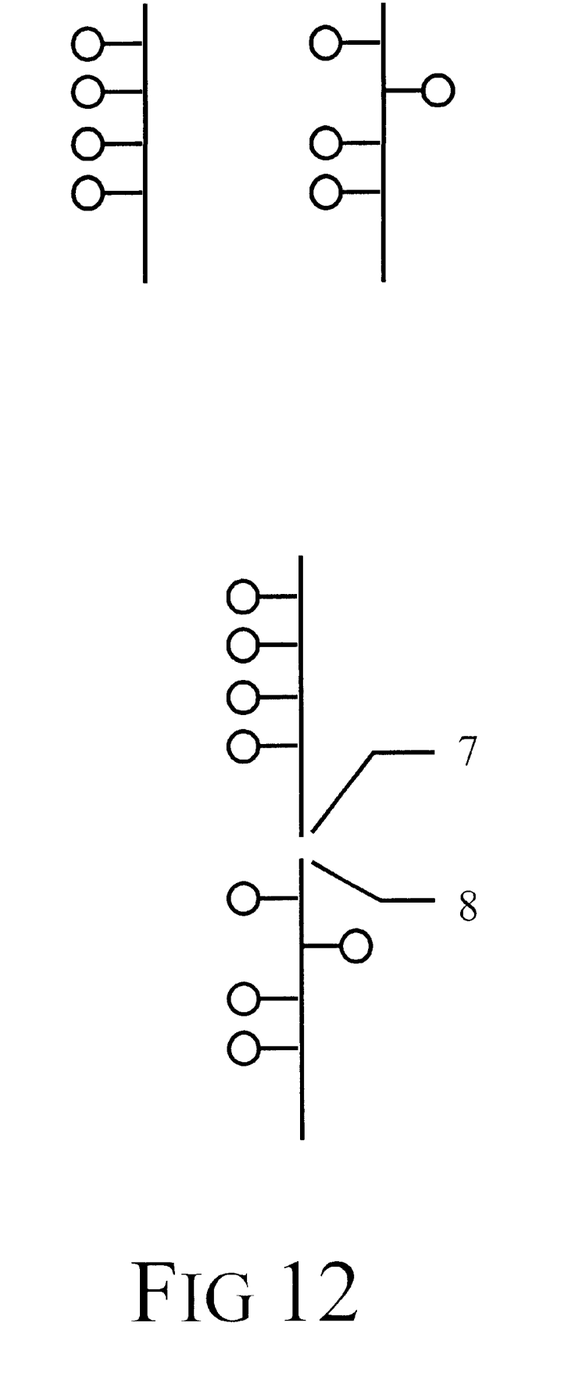
FIG. 12 shows how the use of more than one device increases the range of use or specifically shows how children could visually demonstrate the improper fraction one and 3 quarters.
Figure 13:
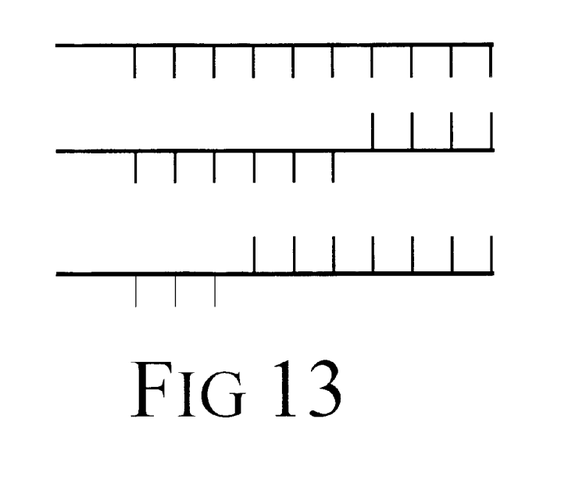
FIG. 13 shows how devices may be joined.
Figure 14:
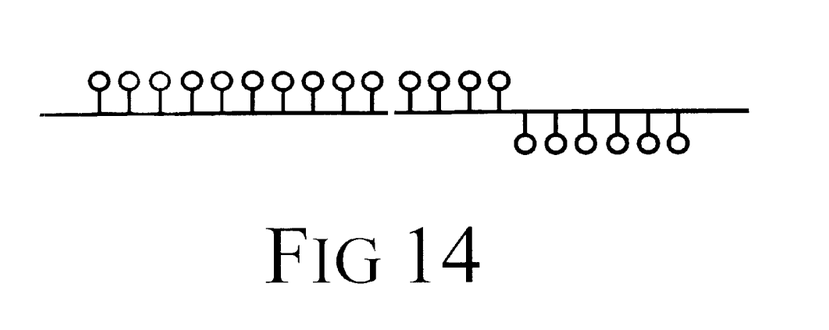
FIG. 14 shows an embodiment of the invention whereby two devices are joined together.
Figure 15:
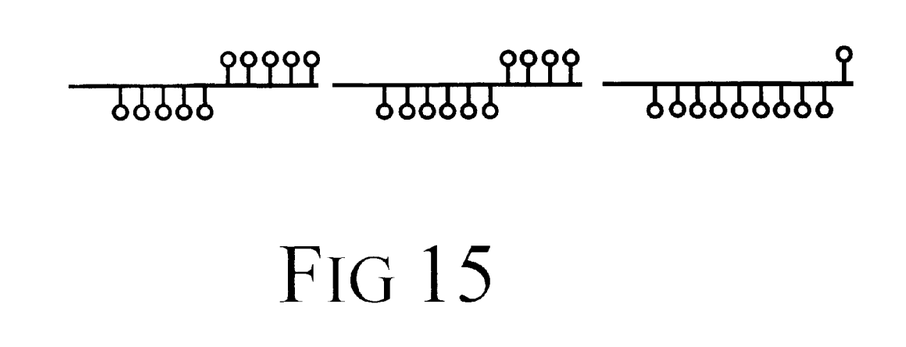
FIG. 15 shows an embodiment of the invention whereby three devices are joined together.

Mathematical use of the device is not restricted to working with a single device. FIGS. 12 and 13, for example, shows how children might put 2 four-arm devices together side by side to make a visual representation of the improper fraction 'one and three quarters', or join them end to end.

It can accordingly be seen, with reference to the attached self-explanatory drawings, that the educational device of the present invention enables opportunities wide ranging in nature. It provides an innovative means of educating children in many aspects of Number, Algebra, Geometry and Statistics in an enjoyable fulfilling hands-on exploratory manner.

Aspects of the present invention have been described by way of example only and it should be appreciated that modifications and additions may be made thereto without departing from the scope thereof.

What I claim is:

1. An educational device comprising an axle and plural rotatable arms extending from said axle that are freely and independently rotatable completely around said axle and falling freely to a side of said axle under the influence of gravity when said axle is at rest on a flat surface, each of said arms having one end attached by a snap-fit clip to said axle and a second end attached to a weight that is shaped such that said arms do not come into contact with each other during rotation.

2. The education device of claim 1, wherein said axle has a length sufficient to accommodate at least five of said rotatable arms and comprising at least five of said arms.

3. The educational device of claim 1, wherein said axle has a length sufficient to accommodate up to ten of said rotatable arms and comprising up to ten of said arms.

4. The educational device of claim 1, wherein said one end of each of said rotatable arms comprises a snap-fit clip for removable attachment to said axle.

5. The educational device of claim 1, wherein each said weight comprises a sphere and each of said arms comprises a pair of parallel legs.

6. The educational device of claim 1, further comprising a handle at one end of said axle, said handle having a tapered receptor at its distal extremity, and a fitting at the end of said axle opposite said handle, said fitting comprising an axle ending to match the said receptor such that two or more said educational devices could be joined end to end.

7. The educational device of claim 1, wherein each said weight is luminescent.

8. The educational device of claim 1, wherein each said weight comprises a source of light.

9. The educational device of clam 1, wherein said axle comprises plural spaced apart ridges that separate said arms from each other.

10. The educational device of claim 1, wherein at least one end of said axle comprises a receptor tapered to receive an end of said axle of another said educational device.

11. The educational device of claim 1, wherein each pair of one said arm and one said weight is marked to denote a numerical value.

12. The educational device of claim 1, wherein said arms are substantially the same length.

13. An educational device comprising:

an axle having a longitudinal axis and two ends;

a handle on at least one of said two ends of said axle for manipulating the educational device and for providing a tapered receptor at its distal end;

up to ten rotatable arms extending from said axle between said two ends and perpendicular to said longitudinal axis and spaced from said handle, said rotatable arms being freely and independently rotatable completely around said axle and depending from said axle under the influence of gravity when the educational device is not being manipulated;

each of said rotatable arms comprising a snap-fit clip for removable attachment of said arms to said axle;

and each of said rotatable arms having a weight at an end thereof that is remote from said axle, each said weight being sized to avoid contacting an adjacent said spherical weight when said arms are rotating.

14. The education device of claim 13, wherein said axle has a length sufficient to accommodate at least ten of said rotatable arms and comprising at least ten of said arms.

15. The educational device of claim 13, wherein each of said arms comprises a pair of parallel legs.

16. The educational device of claim 13, further comprising a fitting at an end of said axle opposite said handle, said fitting being tapered such as to match the receptor of said handle and such that two or more said educational devices could be joined end to end.

17. The educational device of claim 13 wherein each said weight is luminescent.

18. The educational device of claim 13 wherein each said weight comprises a source of light.

19. The educational device of claim 13 wherein each pair of one said arm and one said weight is marked to denote a numerical value.

20. The educational device of claim 13, wherein said arms are substantially the same length.

* * * * *